United States Patent [19]
Knight et al.

[11] Patent Number: 6,017,563
[45] Date of Patent: Jan. 25, 2000

[54] PROCESS FOR OPTIMIZING MILK PRODUCTION

[75] Inventors: Christopher D. Knight, St. Louis, Mo.; Karen M. Koenig; Lyle M. Rode, both of Lethbridge, Canada; Michael J. Vandenberg, St. Louis; Mercedes Vazquez-Anon, Chesterfield, both of Mo.

[73] Assignee: Novus International, Inc., St. Louis, Mo.

[21] Appl. No.: 08/900,414

[22] Filed: Jul. 25, 1997

[51] Int. Cl.[7] .............................. A23K 1/00; A01K 43/00
[52] U.S. Cl. .............................. 426/2; 426/231; 426/635; 426/807; 424/438
[58] Field of Search .............................. 426/2, 807, 63 J, 426/231; 424/438

[56] References Cited

U.S. PATENT DOCUMENTS

| | | | |
|---|---|---|---|
| 3,272,866 | 9/1966 | Conner et al. | 260/583 |
| 3,761,518 | 9/1973 | Haglid | 260/535 R |
| 3,773,927 | 11/1973 | Cummins | 424/166 |
| 4,118,513 | 10/1978 | Braund et al. | 426/2 |
| 4,175,121 | 11/1979 | Mantha | 424/94 |
| 4,310,690 | 1/1982 | Cummins | 562/581 |
| 4,335,257 | 6/1982 | Cummins et al. | 562/581 |
| 4,388,327 | 6/1983 | Cummins | 426/2 |
| 4,524,077 | 6/1985 | Ruest et al. | 514/557 |
| 4,615,891 | 10/1986 | Nocek et al. | 426/231 |
| 5,158,791 | 10/1992 | Nocek et al. | 426/231 |
| 5,167,957 | 12/1992 | Webb, Jr. et al. | 424/115 |
| 5,182,126 | 1/1993 | Vinci et al. | 426/74 |
| 5,225,230 | 7/1993 | Seaman et al. | 426/634 |
| 5,250,307 | 10/1993 | Cummings et al. | 426/72 |
| 5,391,787 | 2/1995 | Vinci et al. | 554/156 |
| 5,413,803 | 5/1995 | Chung | 426/598 |
| 5,425,963 | 6/1995 | Lajoie | 426/2 |
| 5,456,927 | 10/1995 | Vinci et al. | 426/74 |
| 5,532,008 | 7/1996 | Sasaoka et al. | 426/73 |
| 5,631,031 | 5/1997 | Meade | 426/2 |
| 5,720,970 | 2/1998 | Rode et al. | 424/438 |
| 5,763,657 | 6/1998 | Hijiya et al. | 562/561 |

FOREIGN PATENT DOCUMENTS

| | | |
|---|---|---|
| A2194437 | 1/1996 | Canada. |
| 19524054A1 | 1/1996 | Germany. |

OTHER PUBLICATIONS

G.E. Higginbotham, J.D. Schuh, L. Kung and J.T. Huber, Palatability of Methionine Hydroxy Analog or DL-Methionine, Journal of Dairy Science vol. 70, No. 3, 1987, pp. 630–634.

I. Belasco "Fate of Carbon 14 Labeled Methionine Hydroxy Analog and Methionine in the Lactating Dairy Cow" Journal of Dairy Science, vol. 63, No. 5 (1980) pp. 775–784.

I. Belasco "Stability of Methionine Hydroxy Analog in Rumen Fluid and Its Conversion in Vitro to Methionine by Calf Liver and Kidney" Journal of Dairy Science, vol. 55, No. 3 (1972) pp. 353–357.

(List continued on next page.)

*Primary Examiner*—Nina Bhat
*Attorney, Agent, or Firm*—Senniger, Powers, Leavitt & Roedel

[57] ABSTRACT

A process for formulating a ruminant food ration in which the methionine needs of the ruminant are determined, a plurality of natural or synthetic feed ingredients and the nutrient composition of each of the ingredients are identified wherein one of the ingredients is 2-hydroxy-4-(methylthio) butanoic acid or a salt, amide or ester thereof, and a ration is formulated from the identified feed ingredients to meet the determined methionine needs of the ruminant which comprises one or more grains, a hydroxy analog of methionine, and optionally a bypass fat wherein (i) the hydroxy analog of methionine is selected from the group consisting of 2-hydroxy-4-(methylthio)butanoic acid and the salts, amides and esters thereof, (ii) the hydroxy analog of methionine is added separately from any bypass fat which is included in the ration, and (iii) the ration is formulated on the basis that at least 20% of the hydroxy analog of methionine is assumed to be available for absorption by the ruminant.

12 Claims, 12 Drawing Sheets

OTHER PUBLICATIONS

R. Bishop et al. "Effect of Continous Methionine Hydroxy Analog Supplementation on Complete Lactations" Journal of Dairy Science, vol. 55, No. 5, Abstr. P143 (1972) pp. 711.

P. Chandler et al. "Protein and Methionine Hydroxy Analog for Lactating Cows" Journal of Diary Science, vol. 59, No. 11, (1976) pp. 1897–1909.

Feedstuff Staff Editor, "Novus Enters Dairy Market With Liquid HMB" Feedstuffs (Jul. 29, 1996) p. 7.

D. Fox et al. "A Net Carbohydrate and Protein System for Evaluating Cattle Diets: III. Cattle Requirements and Diet Adequacy" Journal of Animal Science, vol. 70 (1992) pp. 3578–3796.

D. Fox "Using Computer Models In Extension to Develop More Profitable Feeding Systems" Computer Applications in Animal Agriculture Workshop, (Jun. 1992) The National Dairy Database.

D. Galligan et al. "Dairy Ration Formulation and Evaluation Program for Microcomputers" Journal of Diary Science, vol. 69, No. 6 (1986) pp. 1656–1664.

D. Galligan et al. "Dairy Ration Formulation (Linear Programming) Microcomputer Program" Combined Meeting of the American Dairy Science Assoc. and the American Society of Animal Science, Lexington, KY, (Jul. 31–Aug. 4, 1989) Journal of Dairy Science, vol. 72, Suppl. 1, Abstr. 1077 (1989) p. 445.

L. Griel et al. "Milk Production Response to Feeding Methionine Hydroxy Analog to Lactating Dairy Cows" Journal of Dairy Science, vol. 51, No. 11 (1968) pp. 1866–1868.

R. Kalter et al., "The Anatomy of an Expert Systems Project" Computer Applications in Animal Agriculture Workshop, (Jun. 1992) The National Dairy Database.

J. O'Connor et al. "A Net Carbohydrate and Protein System for Evaluating Cattle Diets: IV. Predicting Amino Acid Adequacy" Journal of Animal Science, vol. 71 (1993) pp. 1298–1311.

J. Patterson et al. "Metabolism of DL–Methionine and Methionine Analogs by Rumen Microorganisms" Journal of Dairy Sci., vol. 71, No. 12 (1988) pp. 3292–3301.

C. Polan et al. "Methionine Hydroxy Analog: Varying Levels for Lactating Cows" Journal of Dairy Science, vol. 53, No. 5, (May 1970) pp. 607–610.

L. Rode et al. "Economics of Post–Ruminal Amino Acids in High Producing Dairy Cows" 1997 Bioproducts & Novus International Technical Diary Symposium Proceedings, (Feb. 27, 1997) Phoenix, Arizona, pp. 3–14.

W. Robey et al. "An Alternative Approach to Feeding Rumen Undegradable Methionine to Dairy Cows: Optimizing Milk Production" Feed Management (Dec. 1996).

J. Russell et al. "A Net Carbohydrate and Protein System for Evaluating Cattle Diets: I. Ruminal Fermentation" Journal of Animal Science, vol. 70 (1992) pp. 3551–3561.

C. Sniffen et al. "A Net Carbohydrate and Protein System for Evaluating Cattle Diets: II. Carbohydrate and Protein Availability" Journal of Animal Science, vol. 70 (1992) pp. 3562–3577.

"Energy Barrier Breaker—Research Summary 1991 Edition, MEGALAC Rumen Bypass Fat" Church & Dwight Co., Inc., #ML1002–9104 (1991) pp. 1–16.

Brochure "MEGALAC Plus Rumen Bypass Fat With Methionine Hydroxy Analog For Methionine–Limited Cows" Church & Dwight Co., Inc., #ML1004–9407 (1994).

Brochure "MEGALAC Plus Fills the Holes in Your Milk Protein Strategy" Church & Dwight Co., Inc. (1996).

Brochure "MEGALAC Rumen Bypass Fat. How to Feed More When Your Cows Can't Eat More" Church & Dwight Co., Inc. #ML1003–9502 (1995).

Demonstration computer report generated by "Net Carbohydrate and Protein System," Center for Animal Health and Productivity, Kennet Square, PA (1995) 3 pages. {Disclosed report is resident within the computer model software as an example demonstrating the computer program's use and capabilities}.

PROCESS FOR OPTIMIZING MILK PRODUCTION

BACKGROUND OF THE INVENTION

The present invention generally relates to a process for satisfying the nutritional requirements of ruminants for methionine, and more specifically, to a process for meeting those nutritional requirements using the hydroxy analog of methionine (2-hydroxy-4(methylthio)butanoic acid) and its salts, amides and esters.

High producing dairy cows need methionine, lysine and other key essential amino acids to reach their genetic potential for milk production. While amino acids can be added directly to the diets of monogastric animals to overcome nutritional deficiencies, free amino acids are rapidly degraded by rumen bacteria and are of little or no practical benefit in alleviating amino acid deficiencies in ruminants.

Traditionally, undegradable intake protein ("UIP") such as blood meal, fish meal, corn gluten meal and others have been used to provide essential amino acids to ruminants. It is difficult, however, to accurately deliver needed levels of methionine and other essential amino acids without providing excess levels of other non-essential amino acids and, any excess nitrogen which UIP delivers to the rumen must be degraded and eliminated by the animal. Consequently, formulating feeds which satisfy the methionine requirements using UIP sources is not only expensive, it can also affect cow health and productive status.

As an alternative to UIP, attempts have been made to modify or protect methionine in a manner so that it is not susceptible, or at least is less susceptible, to rumen degradation. Various "coatings" for methionine have been proposed which, in theory, enable the rumen protected methionine ("RPM") to clear or "bypass" the rumen without significant destruction by rumen microflora and deliver this key amino acid to the small intestine. Once in the small intestine, the coating dissolves thereby freeing the methionine which is absorbed from the intestine.

The practical application of rumen protected methionine, however, has presented some challenges. For example, some products have limited solubility. For others, pelleting, expander conditioning, mixing, and other normal milling practices fracture the protective coating, making the methionine molecule vulnerable to rumen degradation. Some dairy producers have circumvented this problem by top dressing the rumen protected methionine on final rations. This labor intensive practice, however, does not allow the ingredient to be uniformly distributed in the diet. As a result, cows within a herd may consume different amounts of methionine.

It has been reported that the milk production of dairy cows can be increased by supplementing the diets of the cows with the hydroxy analog of methionine and its salts and esters. See, e.g., U.S. Pat. No. 4,388,327. Previous attempts to implement this technology, however, were met with unpredictable milk production responses.

More recently, the calcium salt and the free acid forms of the hydroxy analog of methionine have been combined with bypass fats in a dry product for use as an ingredient of a ruminant food ration. As understood, the level of inclusion of the bypass fat/hydroxy analog dry product has been determined using a computer model which matches the nutritional requirements of the ruminant with available feed ingredients. This approach, however, suffers from several disadvantages. Because the two ingredients are combined in a predetermined ratio, the product offers less flexibility in formulating a ration which meets a least cost objective and precludes the possibility of formulating a feed ration which includes the hydroxy analog of methionine but not bypass fat. In addition, the dry form of the product is susceptible to the formation of undesirable dust and to non-uniform mixing with other feed ration ingredients.

SUMMARY OF THE INVENTION

Among the objects of the invention, therefore, is the provision of a process for satisfying the nutritional requirements of ruminants for methionine, the provision of such a process in which it is unnecessary to coat or otherwise protect the methionine source from rumen microflora, the provision of such a process in which a predictable milk response is obtained, the provision of such a process which avoids providing excess levels of fats or other non-essential amino acids to the ruminant in order to satisfy the methionine needs, and the provision of such a process in which some of the UIP in a balanced ration may be replaced with a lower cost source of methionine to yield a cost improvement.

Briefly, therefore, the present invention is directed to a process for formulating a ruminant food ration for a ruminant. In this process, the methionine needs of the ruminant are determined. A plurality of natural or synthetic feed ingredients and the nutrient composition of each of said ingredients is identified wherein one of said ingredients is 2-hydroxy-4-(methylthio)butanoic acid or a salt, amide or ester thereof. From the identified feed ingredients, a ration is formulated to meet the determined methionine needs of the ruminant which comprises one or more grains, a hydroxy analog of methionine, and optionally a bypass fat wherein (i) the hydroxy analog of methionine is selected from the group consisting of 2-hydroxy-4-(methylthio)butanoic acid and the salts, amides and esters thereof, (ii) the hydroxy analog of methionine is added separately from any bypass fat which is included in the ration, and (iii) the ration is formulated on the basis that at least 20% of the hydroxy analog of methionine is assumed to be available for absorption by the ruminant.

Other objects and features of this invention will be in part apparent and in part pointed out hereinafter.

DETAILED DESCRIPTION OF THE PREFERRED EMBODIMENTS

Figure 1:
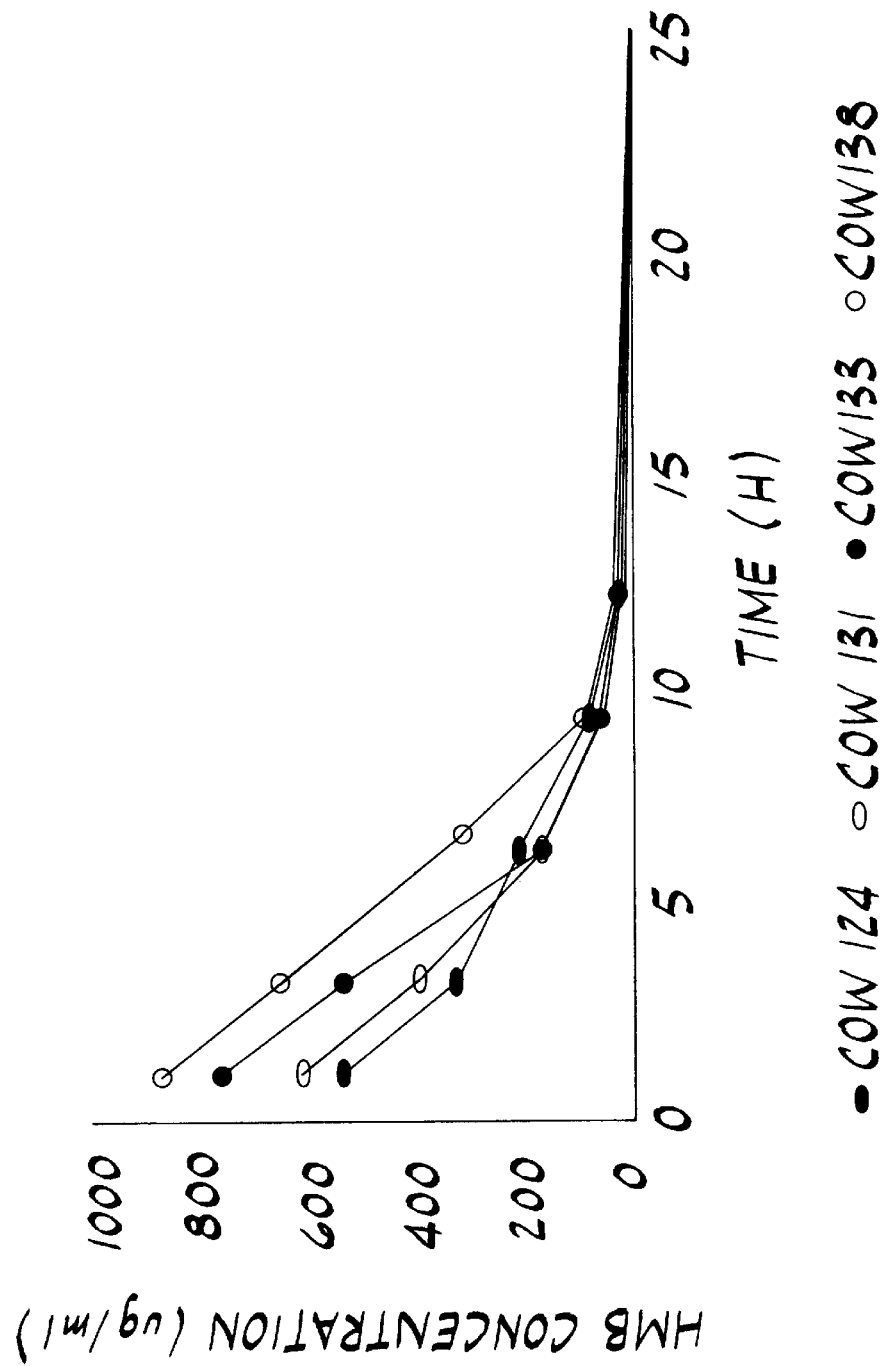
FIG. 1 is a graph of HMB (DL, 2-hydroxy-4-[methylthio] butanoic acid) versus time for the study of Example 1.
Figure 2:
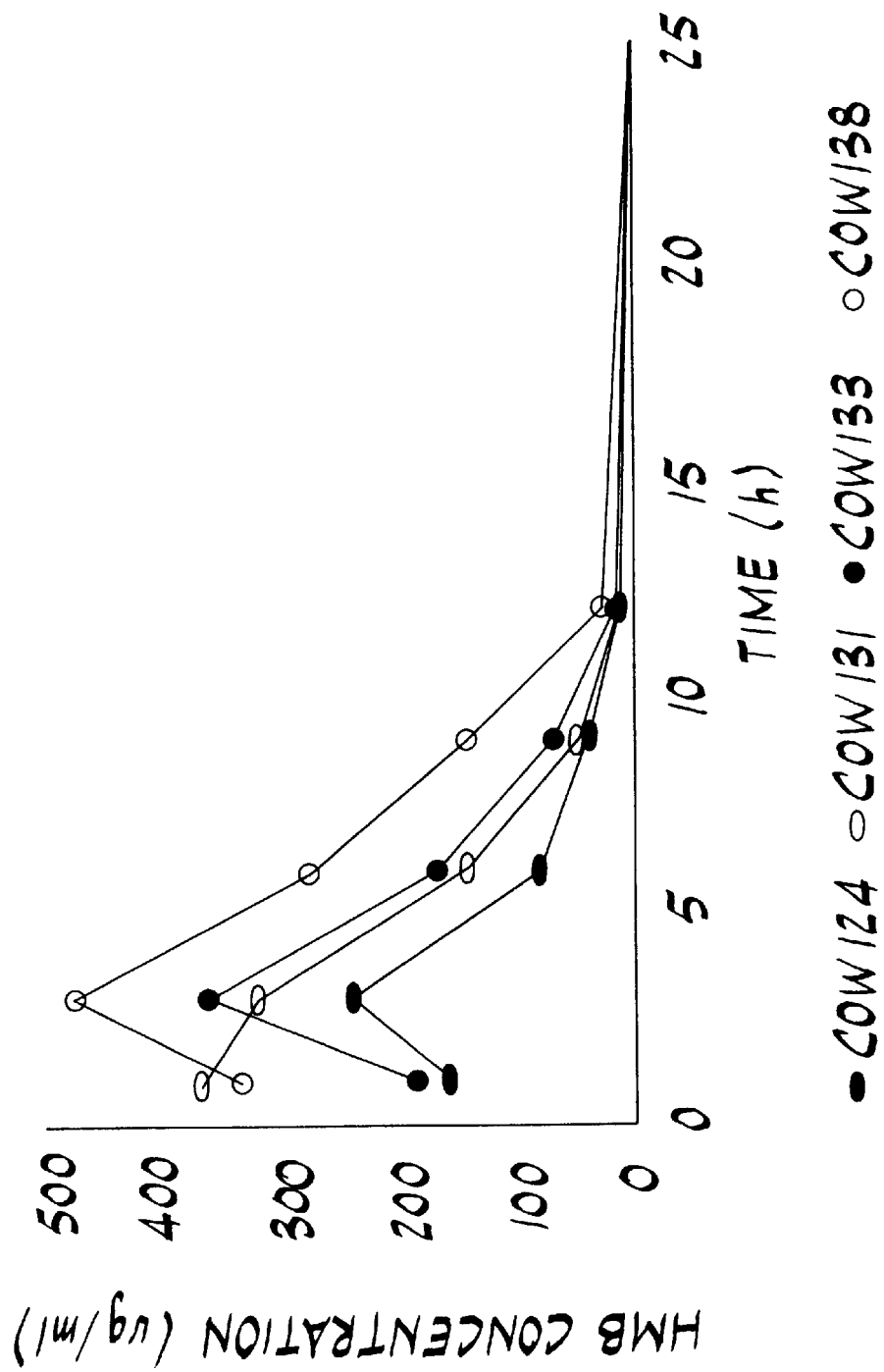
FIG. 2 is a graph of HMB (DL, 2-hydroxy-4-[methylthio] butanoic acid) concentration in the duodenum versus time for the study of Example 1.
Figure 3:
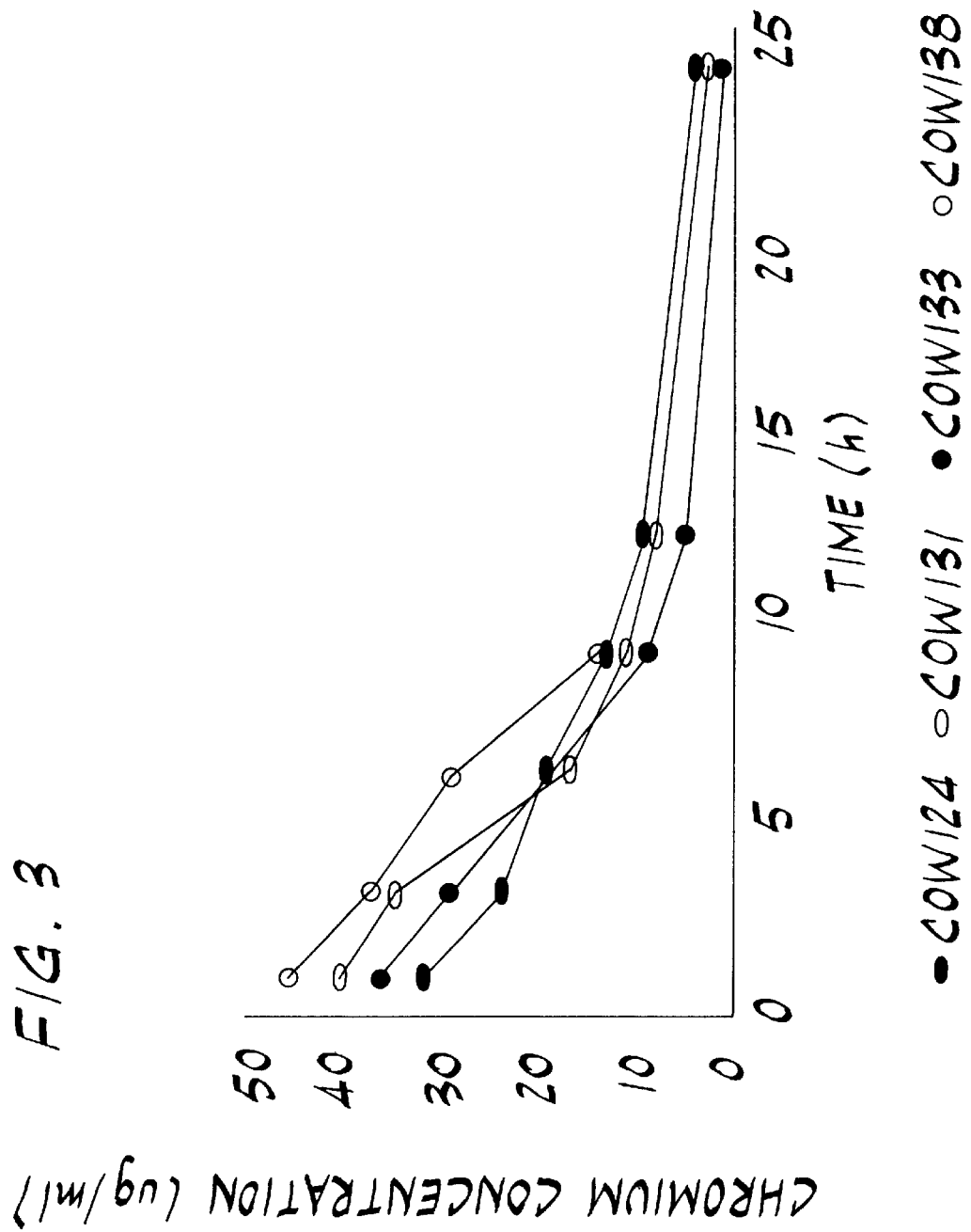
FIG. 3 is a graph of chromium concentration in the rumen versus time for the study of Example 1.
Figure 4:
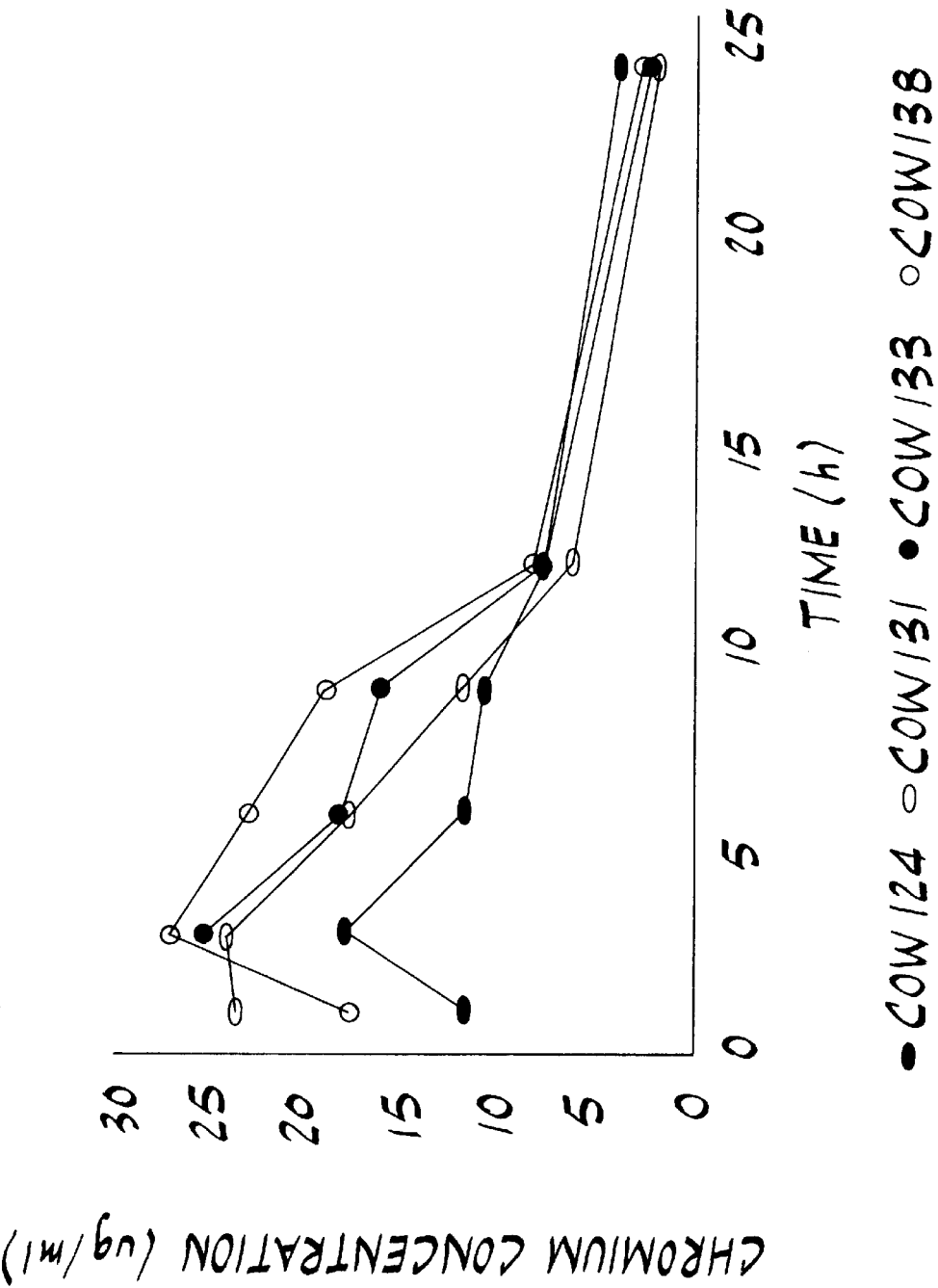
FIG. 4 is a graph of chromium concentration in the duodenum versus time for the study of Example 1.

Optimizing milk production in ruminants requires matching the nutritional requirements of the ruminant with least cost sources from available feed ingredients. In recent years, several computer models have been developed for this purpose; these models enable a dairy nutritionist to predict the methionine and other nutrient requirements for high milk producing dairy cows and to formulate a feed ration using least cost sources. Two of the more well known models are the Cornell Net Carbohydrate and Protein System (CNCPS) and the University of Pennsylvania DAIRYLP program. See, Fox, D. G., Using Computer Models in Extension to Develop More Profitable Feeding Systems, Internet Text Address: HTTP://www.inform.umd.edu; Galligan, D. T., J. D. Ferguson, C. F. Ramberg, Jr. and W. Chalupa. 1986. Dairy Ration Formulation and Evaluation Program for Microcomputers. J.Dairy Sci. 69:1656; Galligan, D. T., C. F. Ramberg, Jr., W. Chalupa and J. D. Ferguson. 1989. J.Dairy Sci. 72:suppl 1):445. In general, the computer models use input data such as animal type, body weight, fat test, milk production level, environmental conditions, nutrient composition of available feeds, feed cost, and rumen bypass rates for degradable protein and amino acid sources. From this information, the models formulate a least cost feed ration which accurately meets the ruminant's nutritional requirements to support the desired level of milk production from available sources which typically will include corn, soy, alfalfa, vitamins, minerals, molasses, fat sources, amino acid sources, undegradable intake protein, and a variety of other feedstuffs.

Depending upon the dose, location of administration and diet or management factors, experimental evidence to date suggests that the amount of methionine hydroxy analog which bypasses the rumen and is available for absorption when the analog is fed to a ruminant in the absence of a bypass fat is at least about 20% on a molecular basis. Experimental bypass data and field work with dairy cattle (based upon milk response) further suggests that the amount which by-passes the rumen is at least about 40% on a molecular basis. Additional experimental evidence suggests that about 8.8% of the analog is absorbed by the omasum and should be available for use. Still further experimental evidence suggests that a certain percentage of methionine hydroxy analog which doesn't clear the rumen is actually absorbed through the rumen's epithelial lining. Everything considered, therefore, the amount of the hydroxy analog of methionine which bypasses the rumen and is available for absorption is between about 40% and about 55%.

In the process of the present invention, a conventional computer model is used to determine the methionine and other nutritional requirements of the ruminant and a least cost feed ration which will meet these requirements is formulated. Advantageously, the feed ration includes the hydroxy analog of methionine and is formulated on the basis that at least 20% of the hydroxy analog is assumed to be available for absorption by the ruminant. Preferably, the ration is formulated on the basis that at least about 40% of the hydroxy analog is assumed to be available for absorption by the ruminant and more preferably on the basis that between about 40% and about 55% of the hydroxy analog is assumed to be available for absorption by the ruminant.

The hydroxy analog of methionine ("MHA") which may be used in the process of the present invention include 2-hydroxy-4(methylthio)butanoic acid, its salts, esters, amides, and oligomers. Representative salts of MHA include the ammonium salt, the stoichiometric and hyperstoichiometric alkaline earth metal salts (e.g., magnesium and calcium), the stoichiometric and hyperstoichiometric alkali metal salts (e.g., lithium, sodium, and potassium), and the stoichiometric and hyperstoichiometric zinc salt. Representative esters of MHA include the methyl, ethyl, 2-propyl, butyl, and 3-methylbutyl esters of MHA. Representative amides of MHA include methylamide, dimethylamide, ethylmethylamide, butylamide, dibutylamide, and butylmethylamide. Representative oligomers of MHA include its dimers, trimers, tetramers and oligomers which include a greater number of repeating units.

In the dairy farm industry, dairy cows are fed as a ration, commonly referred to as a total mixed ration (TMR), which consists of a forage portion and a grain concentrate portion. The forage portion is typically provided by the dairy farmer and generally consists of haylage or silage, with the forage and grain concentrate portions being mixed by the dairy farmer. The grain concentrate portion is typically prepared by a commercial feed mill and is generally prepared by mixing grains such as corn, soy, and alfalfa with vitamins, minerals, molasses, fat sources, synthetic amino acids and a variety of other feedstuffs. These ingredients are blended in commercial feed mills using conventional milling techniques which include augering, mixing, expanding, extruding, and pelleting.

In accordance with the present invention, the hydroxy analog of methionine is added separately and individually as an ingredient in the grain concentrate portion of the ration; stated another way, the amount of hydroxy analog added to the grain concentrate portion of the ration is independent of the amount of bypass fat added (if any) to the grain concentrate portion. Preferably, the hydroxy analog of methionine is the free acid which is a liquid offering several handling and mixing advantages. As a liquid, it is evenly absorbed by the grains and does not settle out of the mixture before consumption by the ruminant. Since its availability to the ruminant is not derived by any protective coating, it can be mixed, augered, exposed to high temperature steam conditioning, extruded, expanded or pelleted with no loss of product activity. In addition, once consumed by the ruminant, the hydroxy analog of methionine is subject to no loss of activity resulting from mastication and cud chewing, as are calcium soaps of fatty acids (common bypass fats), amino acids and other nutrients that derived their activity in the ruminant as a result of a protective coating.

In addition, the hydroxy analog of methionine which is incorporated into the grain concentrate need not be coated with or incorporated into a bypass fat in order to be available to the ruminant. This provides added flexibility to allow the hydroxy analog of methionine to be added at the level required given the ration ingredients and the productivity of the cows receiving the ration.

In general, a bypass fat is a fat which has been chemically or physically altered or synthesized to remain insoluble (or inert) as it passes through the rumen of the cow. Bypass fats typically remain as a solid as they pass through the first parts of a ruminant's digestive tract including the rumen. After passing through the rumen, the fat is solubilized in the initial regions of the small intestine and then becomes available to enzymatic activity through well known mechanisms of fat absorption. Some commercially available bypass fats are described, for example, in U.S. Pat. Nos. 5,182,126; 5,250, 307; 5,391,787; 5,425,963; and 5,456,927 which disclose C14–C22 fatty acids, their glycerides, or their salts including, but not limited to, palmitic, oleic, linoleic, stearic, and lauric compounds. As used herein, however, the term bypass fat does not include fats of natural origin which are normally present in the diet of a cow which include, but are not limited to, animal fats such as poultry fat, animal tallow, animal oil, or vegetable oils such as canola oil, coconut oil, corn oil, cottonseed oil, palm oil, peanut oil, poultry fat, sunflower oil, soybean oil, or safflower oil.

To derive benefit from addition of the hydroxy analog of methionine, one needs only verify that the ration fed at expected levels of consumption, is limiting in its content of available methionine. This is achieved through the use of computer models such as the CNCPS and DAIRYLP in conjunction with the supplementation of the appropriate level of the hydroxy analog of methionine, based on its availability in the ruminant.

As described in greater detail in the examples presented herein, research has confirmed that the hydroxy analog of methionine is readily available as a methionine source for ruminant animals. This work has confirmed the rumen survivability of the hydroxy analog of methionine and its absorption, conversion, appearance in blood plasma as 1-methionine and utilization for milk or muscle tissue. In particular, field trials have demonstrated that the hydroxy analog of methionine statistically increased milk output versus control groups that were verified to be methionine deficient through the use of computer models. In addition, when compared to other sources of rumen protected methionine, or methionine provided via various sources of undegradable intake protein, the hydroxy analog of methionine can be one of the most economical means to provided needed methionine to the ruminant. Formulating a feed ration with the flexibility of being able to identify the specific methionine needs of high producing cows from the methionine hydroxy analog instead of from UIP thus provides cost, herd health, and production advantages to the dairy farm industry.

The following examples will illustrate the invention.

EXAMPLE 1

Objective:

To determine the rumen bypass and gastrointestinal availability of HMB (DL, 2-hydroxy-4-[methylthio]butanoic acid) and the response of serum methionine to HMB supplementation in lactating dairy cows.

Experimental Procedures

The absorption and metabolism of 2-hydroxy-4-[methylthio]butanoic acid sold by Novus International (St. Louis, Mo. under the Alimet® was measured in four lactating dairy cows fitted with rumen and duodenal T-type cannulae (10 cm distal to the pylorus). The cows were offered a basal diet of barley-based concentrate (Table I) and alfalfa hay. The concentrate was fed at a level of 1 kg for every 2.5 kg of milk produced (Table I) and access to alfalfa hay was ad libitum. In addition, cows received 30 g HMB mixed with 2 kg ground corn grain per day for six days to allow for adaptation of the rumen microflora. Cows were then fed 90 g HMB mixed with the ground corn and were administered 600 ml chromium-EDTA (3 g Cr) (Binnerts et al., "Soluble chromium indicator measured by atomic absorption in digestion experiments" *Vet. Rec.* (1968) page 470) into the rumen via the rumen cannula. The HMB meal was offered to the cows for 20 minutes prior to the morning feeding and any of the remaining meal was placed in the rumen via the rumen cannula.

Blood, rumen and duodenal samples were collected at 0, 1, 3, 6, 9, 12 and 24 hours post-HMB-feeding. Blood was collected by jugular veni-puncture into 2×10 ml sterile tubes (Vacutainer Brand SST tubes for serum separation, Bectin Dickenson, Rutherford, N.J.), allowed to stand for 30 minutes in an ice bath and centrifuged at 3000×g to separate the serum from cells. Serum was divided into two fractions. The first fraction was deproteinized by adding an equal volume of acetonitrile and then centrifuging to obtain the supernatant. The deproteinized serum was then frozen (−70° C.) until analysis. A second fraction was not deproteinized but directly frozen (−70° C.). Rumen fluid (100 ml) collected from several sites within the rumen was strained through four layers of cheesecloth and subsampled. The subsample (30 ml) was acidified with 6 M HCl (0.5 ml) and frozen (−40° C.). Duodenal samples collected (100 ml) were also stored frozen (−40° C.). Rumen and duodenal samples were later thawed and centrifuged at 23 000×g, 4° C., for 20 minutes to obtain the clarified supernatant. The clarified rumen and the duodenal samples were then frozen until analysis. Serum was analyzed for methionine and rumen and duodenal samples for HMB. Chromium was measured by atomic absorption spectrophotometry in rumen and duodenal samples that were diluted with an equal volume of a calcium chloride solution to yield samples with approximately 400 ppm $Ca^{2+}$ (Williams et al., "The determination of chromic oxide in faeces samples by atomic absorption spectrophotometry" *J. Agric. Sci.*, Vol. 59 (1962) pp. 381–385).

Results and Discussion

The cows refused to consume the 90 g HMB meal and, therefore, the meal was placed in the rumen. The concentrations of Cr (liquid marker) and HMB in rumen and duodenal fluid for each of the four cows at various times after intraruminal dosing is presented in Table II and FIGS. 1–4. When the data was plotted on a semilogarithmic scale (natural logarithm), it followed a straight line (data not shown). The slope of the line from the semilogarithmic plot is equal to the fractional rate constant (K). The rate constants were calculated by linear regression of the natural logarithm of Cr and HMB concentration verses time (Table III). Regression analysis of rumen Cr concentration was performed with data for 1 to 24 hours (excluding data for 0 hour). The rumen concentration of HMB declined to levels below the detection limit of the analytical technique (<10 ug/ml) by 24 hours and, therefore, regression analysis was performed with data for 1 to 12 hours (excluding data for 0 and 24 hours).

Regression analysis for duodenal Cr and HMB concentration included the data for 3 to 24 hours and 3 to 12 hours, respectively. Excluding the data for 1 hour simplified the analysis by omitting the delay for the translocation of digesta from the rumen to the duodenum. The mathematical equations describing the decline of Cr and HMB in the rumen ($R^2$, 0.9855 and 0.9738, respectively) and duodenum ($R^2$, 0.9744 and 0.9674, respectively) were well fitted to the data.

Assuming that the decline in rumen HMB concentration is due to the passage of HMB from the rumen and microbial degradation of HMB within the rumen, then the fractional rate constant for HMB (−0.3269; Table III) in the rumen will equal the sum of the rate constants for the passage and degradation of HMB.

$$K_{[HMB\text{-}rumen]} = K_{[passage]} + K_{[degradation]}$$

The HMB is soluble, and therefore, the rate at which HMB passes from the rumen will be equivalent to the rate of passage for Cr, the liquid marker (−0.1307). Thus, the rate constant for microbial degradation within the rumen is −0.1962 ($K_{[HMB-rumen]}-K_{[passage]} = K_{[degradation]}$). The rumen degradation of HMB was determined based on the ratio of the rate of degradation of HMB to the total rate of decline of HMB (−0.1962/−0.3269). Thus, 60% percent of the HMB dose disappeared in the rumen with 40% of the dose bypassing the rumen fermentation.

The fractional rate constant for the decline in HMB concentration at the proximal duodenum (−0.3380; Table III) is equal to the sum of the rate constants for passage and disappearance of HMB.

$$K_{[HMB-duodenum]} = K_{[passage]} + K_{[disappearance]}$$

The rate constant for passage of HMB ($K_{[passage]}$) to the duodenum was determined by calculating the rate constant for the passage of the Cr marker (−0.1053; Table III). Thus, 31.2% of the HMB fed to the cows passed to the small intestine (−0.1053/−0.3380×100) and 68.8% disappeared [(−0.3380−(−0.1053))/−0.3380×100]. The K for disappearance at the duodenum includes the K for degradation in the rumen and the K for absorption postruminally but pre-intestinally (presumably the omasum).

$$K_{[disappearance]} = K_{[rumen\ degradation]} + K_{[omasal\ absorption]}$$

It was determined from the rumen decline in HMB, that 60% of the HMB disappeared in the rumen. Therefore, the remaining 8.8% of HMB disappearance was due to omasal absorption. Of the original dose of HMB fed to the dairy cows, 60% was degraded in the rumen, 8.8% was absorbed in the omasum and 31.2% passed to the small intestine for absorption. While we have defined ruminal disappearance as degradation, the substantial quantity of omasal absorption of HMB indicates that it is likely that some fraction of the 60% ruminal disappearance may have occurred via absorption through the rumen wall. As HMB is absorbed via passive diffusion in other species, it is reasonable to expect this phenomenon to occur in rumen epithelium as well. Therefore, the bioavailability of 40% for HMB, as a methionine source for ruminants, is likely a conservative underestimate.

Figure 5:
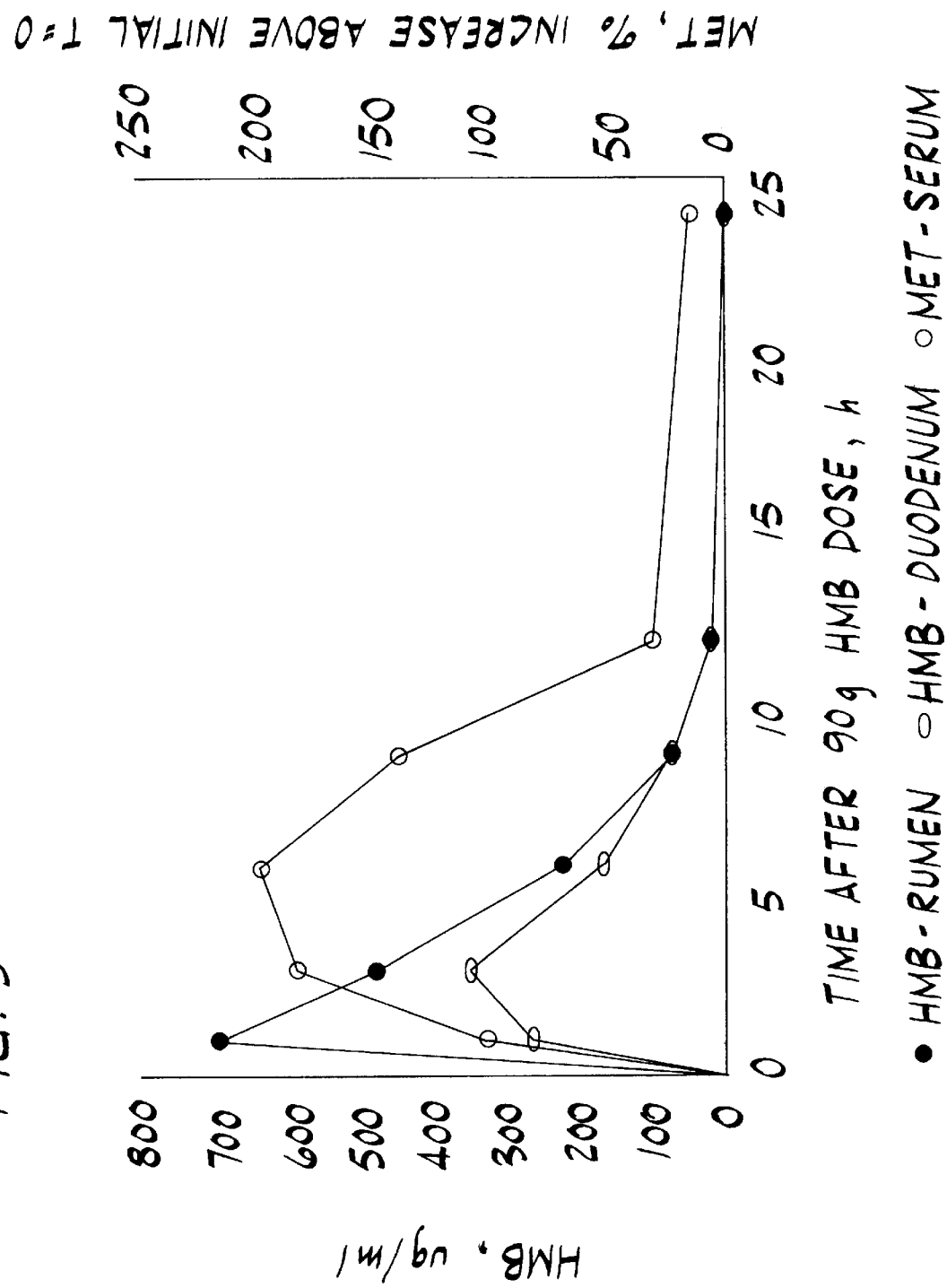
FIG. 5 is a graph showing rumen and duodenal HMB (DL, 2-hydroxy-4-[methylthio]butanoic acid) and serum methionine response following oral dosing of 90 g HMB in lactating dairy cows for the study of Example 1.

Peak concentrations for ruminal and duodenal HMB occurred at 1 and 3 hours, respectively. Peak serum methionine concentration occurred at 6 hours. By 12 hours, all values had returned to pre-dose levels (FIG. 5). The absorption of HMB from the omasum and small intestine and its subsequent metabolism to methionine produced an increase in serum methionine of 200% above pre-dose levels at the peak concentration.

TABLE I

Composition of Concentrate

| Item Ingredient, % (as-fed basis) | |
|---|---|
| Barley grain (medium roll) | 51 |
| Rolled corn | 10 |
| Beet pulp | 8.5 |
| Blood meal | 11.5 |
| Soybean meal | 4.2 |
| Canola meal | 4 |
| Canola oil | 3.5 |
| Liquid molasses | 2 |
| Mineral premix[1] | 2 |
| Sodium bicarbonate | 1.5 |
| Dicalcium phosphate | 1 |
| Perma-Pell | 0.8 |
| Vitamin ADE[2] | 0.025 |
| Flavor[3] | 0.017 |

[1]Supplies per kg of concentrate: Na, 0.7%; S, 0.2%; K, 0.02%; Mg. 0.01%; Zn, 154 mg/kg; Mn, 147 mg/kg; Cu, 40 mg/kg; 1, 2 mg/kg; Se, 0.8 mg/kg; and Co, 0.6 mg/kg.
[2]Supplies per kg of concentrate: vitamin A, 2500 IU; vitamin D, 250 IU; and vitamin E 2.5 IU.
[3]ACS Cattle feeding flavor, Alltech, Inc.

TABLE II

Chromium and HMB Concentration in Rumen and Duodenal Fluid

| Time (h) | Chromium Concentration (ug/ml) | | | | HMB Concentration (ug/ml) | | | |
|---|---|---|---|---|---|---|---|---|
|  | 124 | 131 | 133 | 138 | 124 | 131 | 133 | 138 |
| Rumen | | | | | | | | |
| 0 | 0.04 | 0.07 | 0.01 | 0.02 | <10 | <10 | <10 | <10 |
| 1 | 31.83 | 36.27 | 40.44 | 45.51 | 538.6 | 615.1 | 766.6 | 875.8 |
| 3 | 23.77 | 29.11 | 34.52 | 37.05 | 326.7 | 401.1 | 539.1 | 656.3 |
| 6 | 19.29 | 18.09 | 16.62 | 27.94 | 209.9 | 170.3 | 173.4 | 342.0 |
| 9 | 12.93 | 8.89 | 10.79 | 13.89 | 78.6 | 50.8 | 59.3 | 94.0 |
| 12 | 9.16 | 5.04 | 7.86 | 8.28 | 22.1 | 13.2 | 22.8 | 19.7 |
| 24 | 3.62 | 1.07 | 2.08 | 1.97 | <10 | <10 | <10 | <10 |
| Duodenum | | | | | | | | |
| 0 | 1.36 | 0.05 | 0.05 | 0.02 | <10 | <10 | <10 | <10 |
| 1 | 11.69 | 23.80 | 12.14 | 17.98 | 159.3 | 370.6 | 189.2 | 336.8 |
| 3 | 18.30 | 24.55 | 25.41 | 27.23 | 245.5 | 324.5 | 367.5 | 477.8 |
| 6 | 11.99 | 17.86 | 18.42 | 23.24 | 81.7 | 146.2 | 169.8 | 276.3 |
| 9 | 11.00 | 12.16 | 16.36 | 19.26 | 40.6 | 47.1 | 70.3 | 142.7 |
| 12 | 7.89 | 6.39 | 7.89 | 8.39 | 11.6 | 13 | 15.1 | 25.4 |
| 24 | 3.88 | 2.06 | 2.29 | 2.85 | <10 | <10 | <10 | <10 |

TABLE III

Linear Regression Analysis of the Natural Logarithm of Cr and HMB Concentration in Rumen and Duodenal Fluid Verses Time

| Cow | Chromium | | | HMB | | |
|---|---|---|---|---|---|---|
| | Constant | K | $R^2$ | Constant | K | $R^2$ |
| Rumen | 1 to 24 hours | | | 1 to 12 hours | | |
| 24 | 3.4702 | −.0940 | .9883 | 6.7179 | −.2809 | .9654 |
| 131 | 2.7330 | −.1576 | .9878 | 6.9865 | −.3506 | .9835 |
| 133 | 3.7310 | −.1302 | .9781 | 7.1155 | −.3317 | .9940 |
| 138 | 3.9905 | −.1411 | .9877 | 7.4596 | −.3444 | .9524 |
| Mean | 3.7312 | −.1307 | .9855 | 7.0699 | −.3269 | .9738 |
| SD | 0.2124 | .0270 | .0049 | .3081 | .0317 | .0185 |
| Fitted Equation | $Y = 41.7292e^{-.1307t}$ | | | $Y = 1176.0304e^{-.3269t}$ | | |
| Duodenum | 3 to 24 hours | | | 3 to 12 hours | | |
| 124 | 3.0038 | −.0705 | .9747 | 6.4793 | −.3285 | .9895 |
| 131 | 3.5284 | −.1201 | .9823 | 6.9923 | −.3595 | .9895 |
| 133 | 3.6342 | −.1173 | .9796 | 7.1167 | −.3486 | .9713 |
| 138 | 3.7419 | −.1135 | .9608 | 7.3626 | −.3155 | .9194 |
| Mean | 3.4771 | −.1053 | .9744 | 6.9877 | −.3380 | .9674 |
| SD | .3273 | .0234 | .0096 | .3722 | .0198 | .0331 |

EXAMPLE 2

In a lactation study, the effects of providing Alimet® (2-hydroxy-4-[methylthio]butanoic acid sold by Novus International (St. Louis, Mo.)) feed supplement in the close-up pre-lactation dry period and in early lactation diets was evaluated. The diets (Table IV) were formulated to include Alimet® to meet the methionine requirements as determined using existing computer modeling technology (CNCPS and DAIRYLP). The diets were balanced to meet amino acid requirements and included standard feed ingredients used in dairy rations. In the absence of added Alimet®, the control diet was predicted to be first limiting in methionine. The estimated need for methionine was approximately 9 grams per day. Alimet® was added assuming an availability to the ruminant of 20%.

Figure 6:
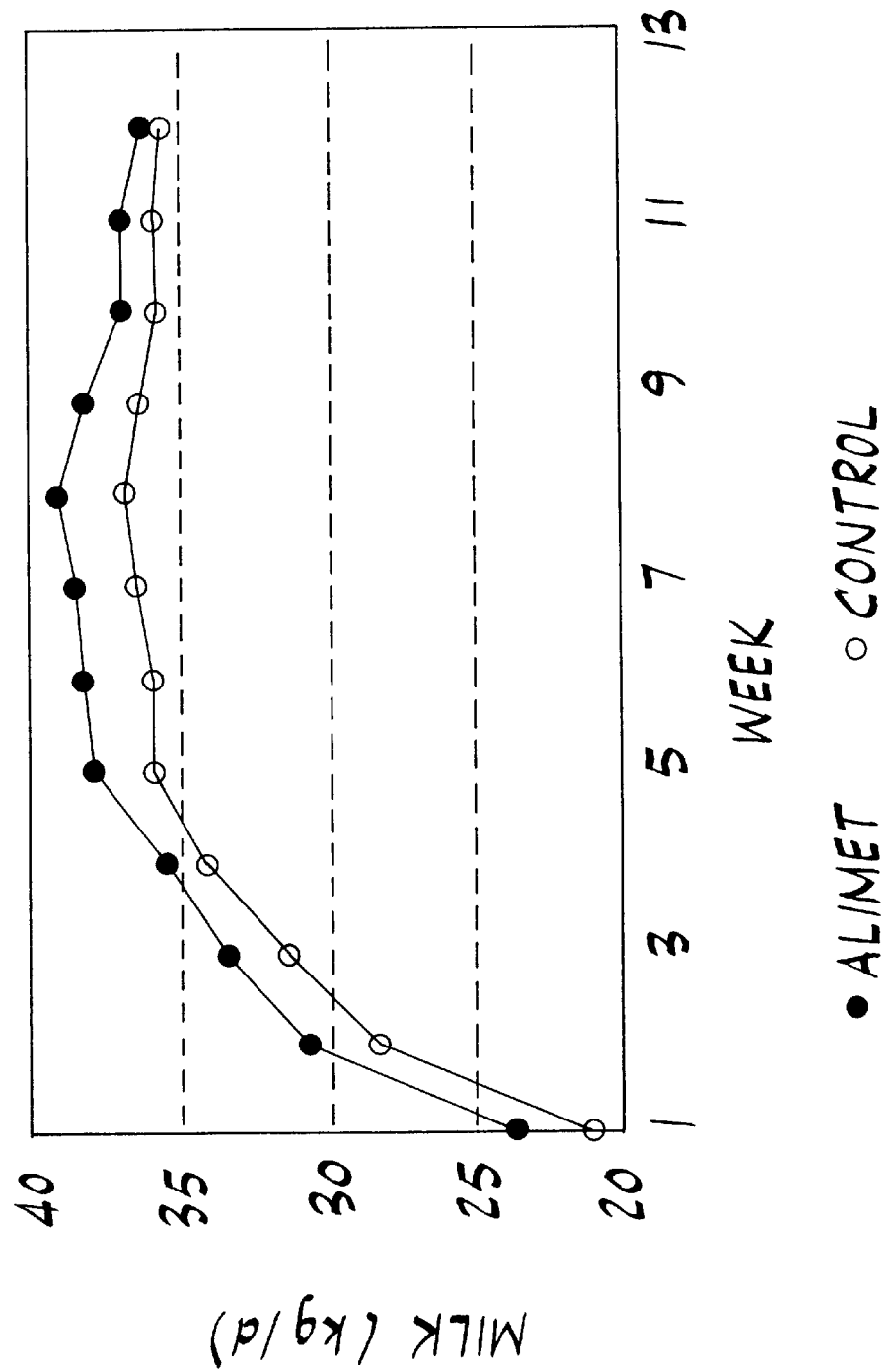
FIG. 6 is a graph showing milk production (kg/d) versus time for the study of Example 2.
Figure 7:
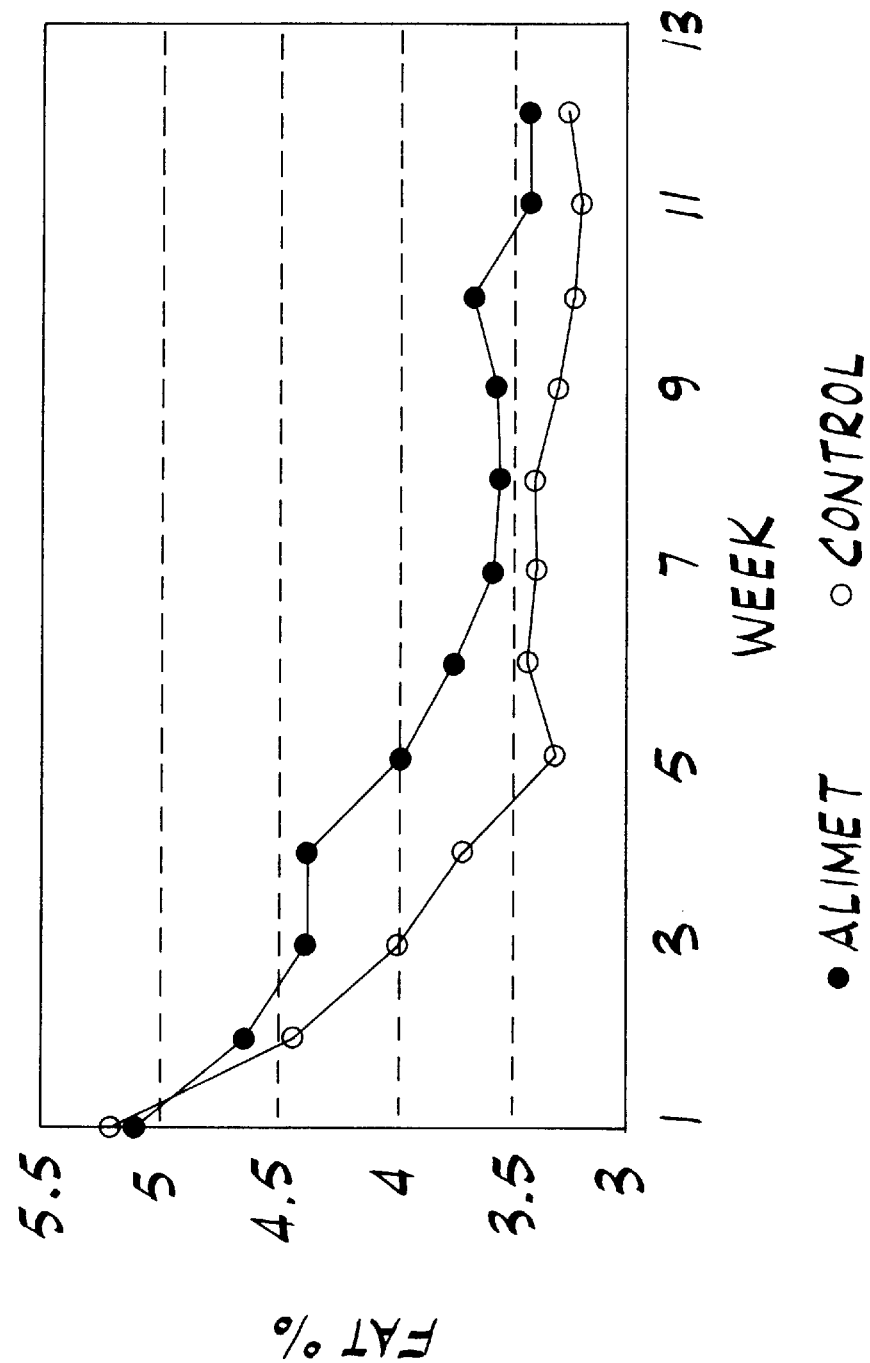
FIG. 7 is a graph showing fat percentage in milk versus time for the study of Example 2.
Figure 8:
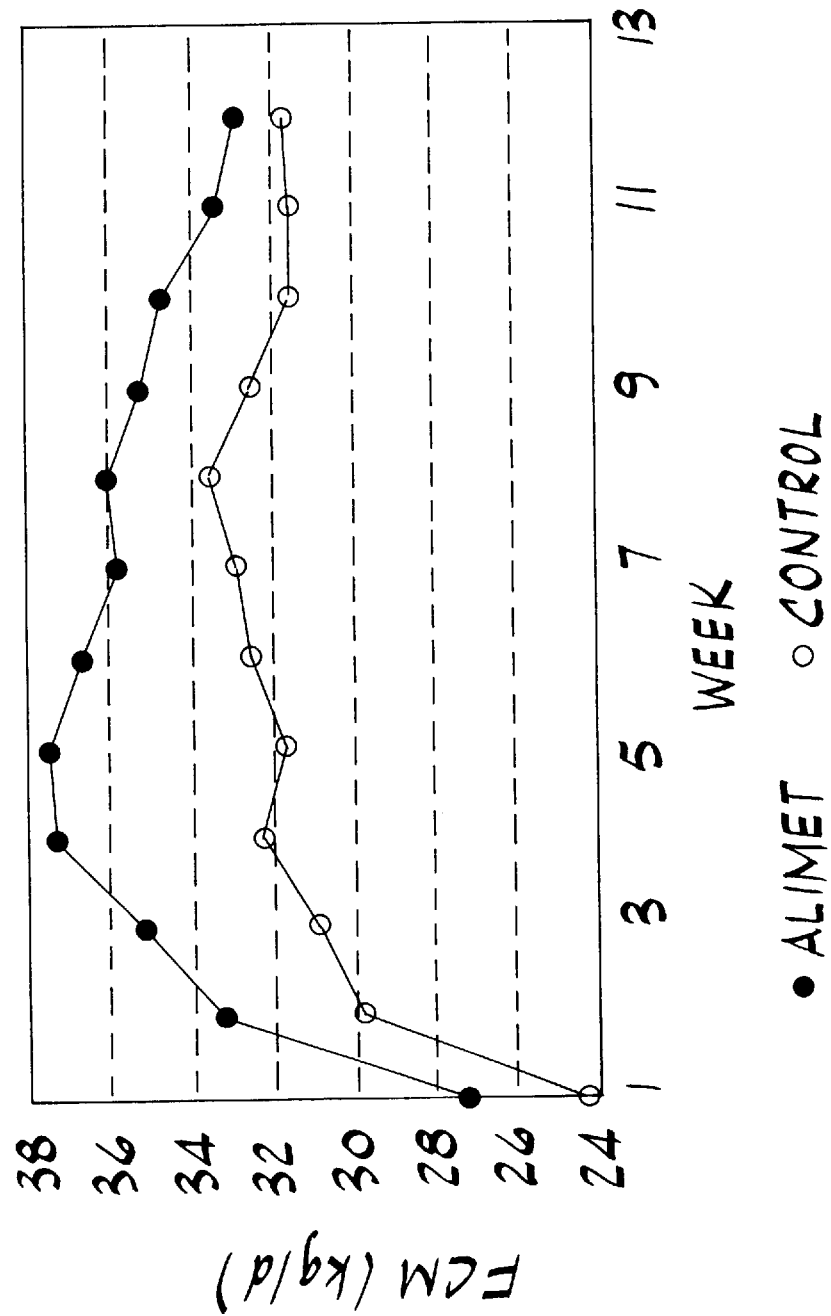
FIG. 8 is a graph showing fat corrected milk yield (kg/d) versus time for the study of Example 2.
Figure 9:
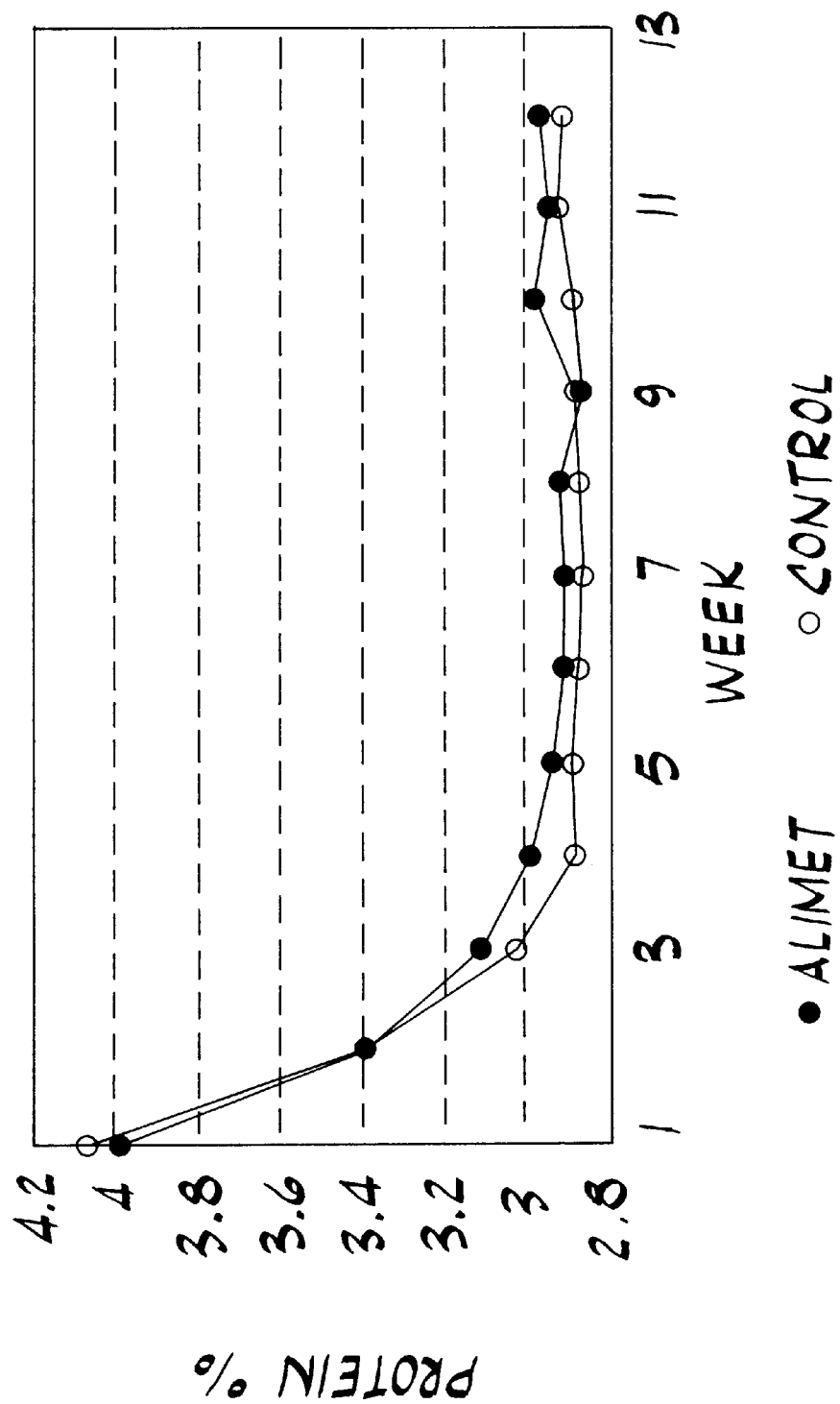
FIG. 9 is a graph showing protein percentage in milk versus time for the study of Example 2.

This study included 10 multiparous and five primiparous cows per treatment, supplemented with Alimet® for two weeks before calving and for 12 weeks of lactation. The Alimet® treatment group produced more milk (33.9 vs 31.3 kg/d; FIG. 6) with a higher fat content (4.01% vs 3.71%; FIG. 7) than unsupplemented cows. This resulted in more fat-corrected content (FCM) production for the Alimet-fed cows (33.4 vs 29.2 kg/d; FIG. 8) but not milk protein content (FIG. 9). At peak milk yield, Alimet-fed multiparous cows produced 7.9 kg/d more FCM than unsupplemented cows (42.0 vs 34.1 kg/d). The benefits of supplying post ruminal amino acid would appear to be greatest during the close-up dry period and early lactation.

TABLE IV

| Basal Ration* | |
|---|---|
| Barley | 27% |
| Cottonseed | 11% |
| Soy bean meal | 6.3% |
| Corn distillers grain | 8.0% |

TABLE IV-continued

| Basal Ration* | |
|---|---|
| Blood meal | 2.0% |
| Megalac (bypass fat) | 2.0% |
| Alfalfa haylage | 24% |
| Alfalfa hay | 17% |

*Standard basal diet without Alimet ®

EXAMPLE 3

In a field trial, Alimet® (2-hydroxy-4-[methylthio] butanoic acid sold by Novus International (St. Louis, Mo.) at a 40% bypass estimate) was fed to 75 high producing early lactation cows as part of their diet. The Cornell Net Carbohydrate Net Protein Model was used to evaluate the diet (corn grain based diet) being fed to these cattle. The ration being fed was balanced for 90 pounds of 3.7% butterfat milk per cow per day. In the absence of added Alimet®, the diet was predicted to be first limiting in methionine.

Seventy five multiparous cows were used in each group. The cows were housed in either side of a modern, well ventilated free stall barn. Cattle were allocated to treatment by calving date. As cows calved they were alternately placed in the Alimet® group or a group fed the same commercial TMR without Alimet®. This commercial TMR represents the standard TMR fed in the field at commercial dairies at that time. Milk production of each cow was measured at every milking until 75 cows had been on Alimet® for approximately 90 days and 75 cows had been on the control TMR for about 90 days.

The statistical model used was for a completely randomized design. This design is established by assigning treatments at random to a previously selected set of experimental units. In this case, the treatments were Alimet® or no Alimet®, and the experimental units were cows that were freshening. Assignment to treatment was completely randomized since it was based on calving order. As previously mentioned, cows were placed alternately into the Alimet® group or treatment group as they calved. The data were analyzed with a one way Analysis of Variance procedure, using the F test to determine statistical differences.

The data indicate that the cows receiving Alimet® produced over 5 pounds more milk per cow per day during the period of the trial. This production response was significant at the P<0.04 level (Table V). One cow was excluded from the control group due to extremely low milk production, therefore only 74 cows were used for statistical analysis. The last cow to complete the 90 days of Alimet® feeding was not used in order to balance cow numbers across treatments. This cow averaged 90 pounds of milk per day. There was no significant difference in days in milk of cows in either group when the trial was concluded.

In conclusion, this data set shows that Alimet® provides an acceptable source of bypass methionine in high producing, early lactation cows, when fed from the beginning of lactation onward, to cows consuming a corn silage based diet.

TABLE V

| Source of Variation | SS | df | MS | F | P-value | F crit |
|---|---|---|---|---|---|---|
| ANOVA | | | | | | |
| Between Groups | 935.5762848 | 1 | 935.5763 | 4.312277 | 0.039591 | 3.905939 |
| Within Groups | 31675.6377 | 146 | 216.9564 | | | |
| Total | 32611.21399 | 147 | | | | |

Conclusion:

Trial compared two groups of early lactation cows. One group was fed Alimet® and the other was not. The diets were isonitrogenous; the Alimet® diet crude protein level was adjusted to account for the nitrogen provided by the treatment. Both diets were fed as Total Mixed Rations on an ad libitum basis.

The data indicate that the feeding of Alimet® resulted in an increase of 5.03 pounds of milk per cow per day. This result is statistically significant at the P=0.0396 level.

EXAMPLE 4

In a field trial, Alimet® (2-hydroxy-4-[methylthio] butanoic acid sold by Novus International (St. Louis, Mo.) at a 40% bypass estimate) was fed to 600 cows of a 1900 cow commercial dairy as part of their standard, commercial ration. Computer models were used to determine methionine deficiency and to balance the ration for Alimet® inclusion. The six hundred cows consumed an average of 3.8 grams of Alimet® per head per day over a 102 day feeding period. In the absence of added Alimet®, the control diet was predicted to be first limiting in methionine. The Alimet® supplemented cows produced an average of 2.67 lb. (1.21 kg) more milk per cow daily. Milk protein yield averaged 0.22 lb. (99.8 g) more per cow daily. Milk fat yield averaged 0.26 lb. (118 g) more per cow daily.

Figure 10:
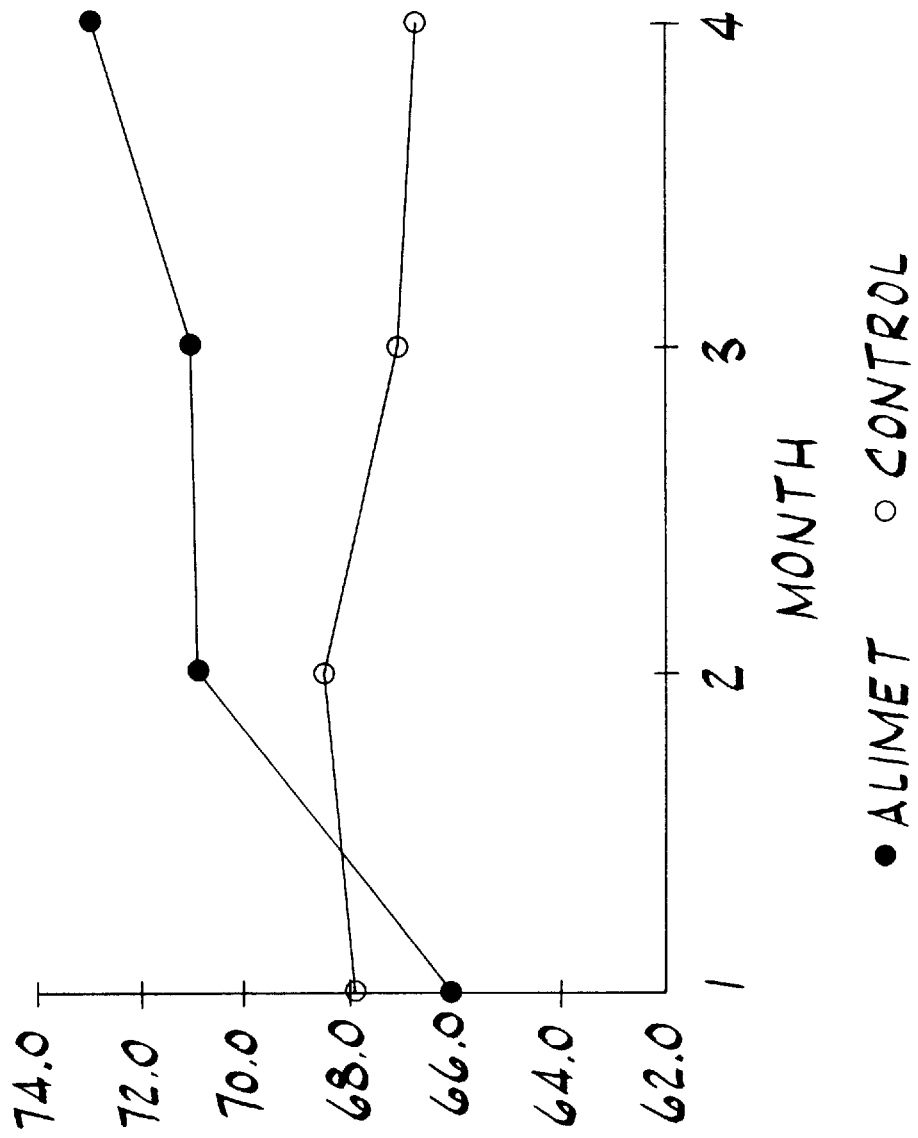
FIG. 10 is a graph showing milk production (lb./cow/day) versus time for the study of Example 4.
Figure 11:
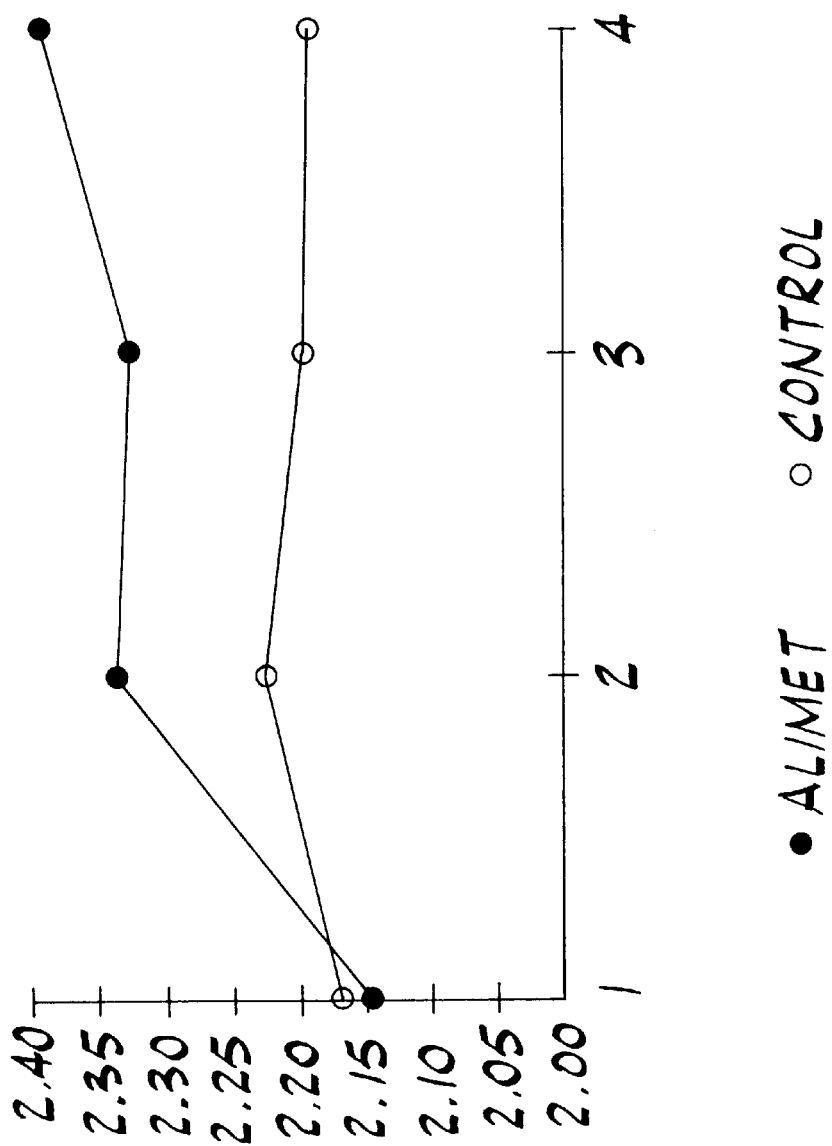
FIG. 11 is a graph showing milk protein (lb./cow/day) versus time for the study of Example 4.
Figure 12:
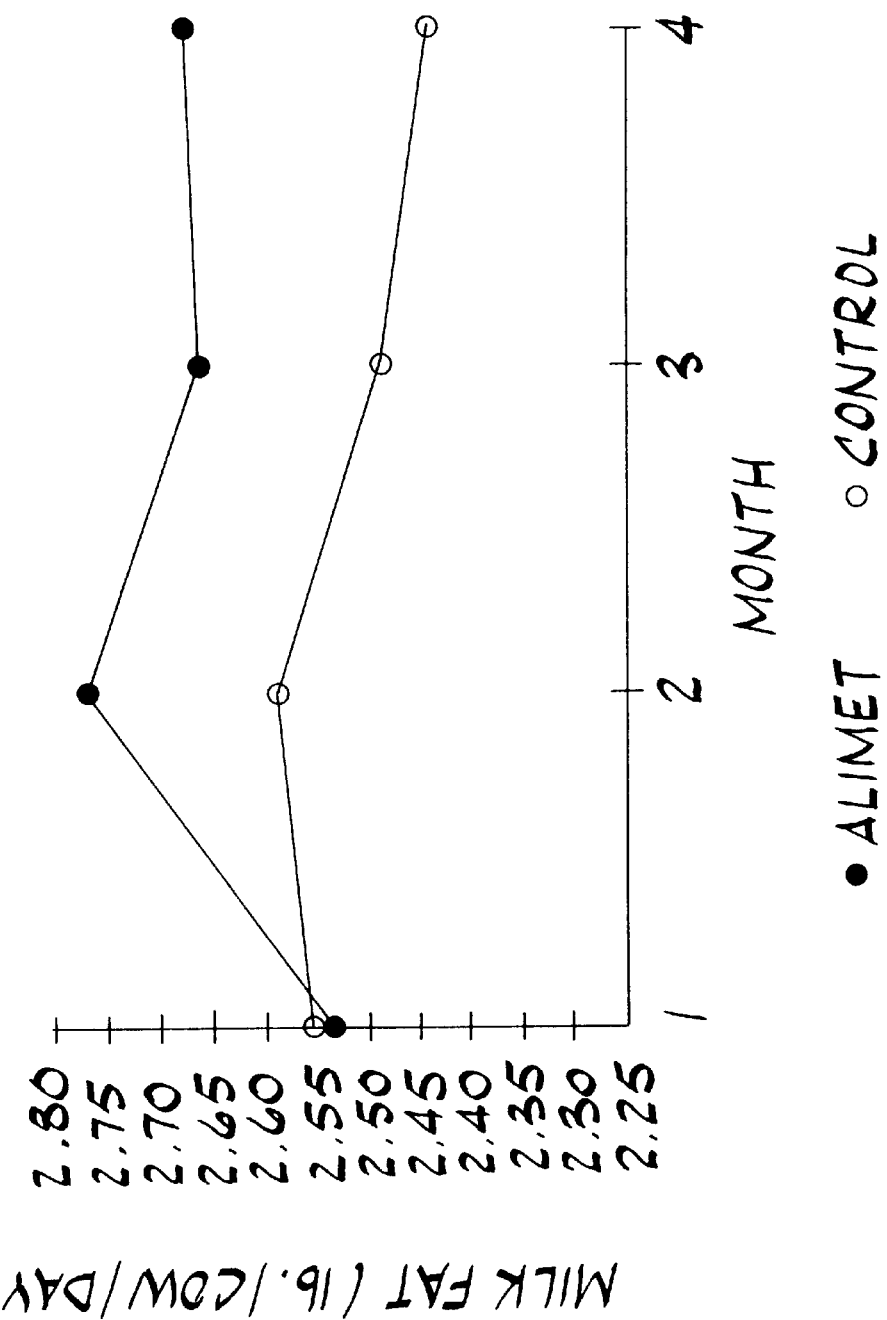
FIG. 12 is a graph showing milk fat (lb./cow/day) versus time for the study of Example 4.

FIGS. 10–12 summarize the data. It should be noted that the supplement began on the sixth day of month 1 and ended on the fifteenth day of month 4.

In view of the above, it will be seen that the several objects of the invention are achieved.

As various changes could be made in the above compositions and processes without departing from the scope of the invention, it is intended that all matter contained in the above description be interpreted as illustrative and not in a limiting sense.

We claim:

1. A process for formulating a ruminant food ration, the process comprising:

determining the methionine needs of the ruminant, identifying a plurality of natural or synthetic feed ingredients and the nutrient composition of each of said ingredients wherein one of said ingredients is a hydroxy analog of methionine selected from the group consisting of 2-hydroxy-4-(methylthio)butanoic acid, salts, amides and esters thereof, and formulating a ration from the identified feed ingredients to meet the determined methionine needs of the ruminant which comprises one or more grains, the hydroxy analog of methionine, and optionally a bypass fat wherein (i) the hydroxy analog of methionine is added separately from any bypass fat which is included in the ration, and (ii) the ration is formulated on the basis that at least 20% of the hydroxy analog of methionine is assumed to be available for absorption by the ruminant.

2. The process of claim 1 wherein the hydroxy analog of methionine is 2-hydroxy-4-(methylthio)butanoic acid.

3. The process of claim 1 wherein the ration is formulated on the basis that at least 40% of the hydroxy analog of methionine is assumed to be available for absorption by the ruminant.

4. The process of claim 1 wherein the hydroxy analog of methionine is 2-hydroxy-4-(methylthio)butanoic acid and the ration is formulated on the basis that at least 40% of the hydroxy analog of methionine is assumed to be available for absorption by the ruminant.

5. The process of claim 1 wherein the ration does not comprise a bypass fat.

6. A process for formulating a ruminant food ration, the process comprising:

determining the methionine needs of the ruminant, identifying a plurality of natural or synthetic feed ingredients and the nutrient composition of each of said ingredients wherein one of said ingredients is a hydroxy analog of methionine selected from the group consisting of 2-hydroxy-4-(methylthio)butanoic acid salts, amides and esters thereof, and formulating a ration from the identified feed ingredients to meet the determined methionine needs of the ruminant which comprises mixing one or more grains with a liquid comprising the hydroxy analog of methionine wherein the ration is formulated on the basis that at least 20% of the hydroxy analog of methionine is assumed to be available for absorption by the ruminant.

7. The process of claim 6 wherein the ration is formulated on the basis that at least 40% of the hydroxy analog of methionine is assumed to be available for absorption by the ruminant.

8. A process for formulating a ruminant food ration, the process comprising:

determining the methionine needs of the ruminant, identifying a plurality of natural or synthetic feed ingredients and the nutrient composition of each of said ingredients wherein one of said ingredients is a hydroxy analog of methionine selected from the group consisting of 2-hydroxy-4-(methylthio)butanoic acid, salts, amides and esters thereof, and formulating a ration from the identified feed ingredients to meet the determined methionine needs of the ruminant which comprises mixing one or more grains with the hydroxy analog of methionine, wherein (i) the ration is formulated on the basis that at least 20% of the hydroxy analog of methionine is assumed to be available for absorption by the ruminant, and (ii) the ration does not comprise a bypass fat.

9. The process of claim 8 wherein the hydroxy analog of methionine is 2-hydroxy-4-(methylthio)butanoic acid.

10. The process of claim 8 wherein the ration is formulated on the basis that at least 40% of the hydroxy analog of methionine is assumed to be available for absorption by the ruminant.

11. A process for formulating a lactating dairy cow food ration, the process comprising:

determining the methionine needs of the cow, identifying a plurality of natural or synthetic feed ingredients and the nutrient composition of each of said ingredients wherein one of said ingredients is 2-hydroxy-4-(methylthio)butanoic acid, and formulating a ration from the identified feed ingredients to meet the determined methionine needs of the cow which comprises mixing one or more grains with 2-hydroxy-4-(methylthio)butanoic acid, wherein the ration is formulated on the basis that at least 40% of the 2-hydroxy-4-(methylthio)butanoic acid is assumed to be available for absorption by the cow.

12. The process of claim 11 wherein the ration is formulated on the basis that between about 40% and about 55% of the 2-hydroxy-4-(methylthio)butanoic acid is assumed to be available for absorption by the ruminant.

* * * * *

(12) EX PARTE REEXAMINATION CERTIFICATE (5271st)
United States Patent
Knight et al.

(10) Number: US 6,017,563 C1
(45) Certificate Issued: Feb. 14, 2006

(54) PROCESS FOR OPTIMIZING MILK PRODUCTION

(75) Inventors: Christopher D. Knight, St. Louis, MO (US); Karen M. Koenig, Lethbridge (CA); Lyle M. Rode, Lethbridge (CA); Michael J. Vandenberg, St. Louis, MO (US); Mercedes Vazquez-Anon, Chesterfield, MO (US)

(73) Assignee: Novus International, Inc., St. Louis, MO (US)

Reexamination Request:
No. 90/006,744, Aug. 13, 2003

Reexamination Certificate for:
Patent No.: 6,017,563
Issued: Jan. 25, 2000
Appl. No.: 08/900,414
Filed: Jul. 25, 1997

(51) Int. Cl.
*A23K 1/00* (2006.01)
*A01K 43/00* (2006.01)

(52) U.S. Cl. .............. 426/2; 426/231; 426/635; 426/807; 424/438

(58) Field of Classification Search .............. 426/2, 426/231, 635, 807, 623, 630, 636; 424/438
See application file for complete search history.

(56) References Cited

U.S. PATENT DOCUMENTS

| | | | |
|---|---|---|---|
| 2,745,745 A | 5/1956 | Blake et al. | |
| 2,879,162 A | 5/1959 | Baldini et al. | |
| 2,938,053 A | 5/1960 | Blake et al. | |
| 4,000,318 A | 12/1976 | Ferguson et al. | |
| 4,118,513 A | 10/1978 | Braund et al. | |
| 4,388,327 A | * 6/1983 | Cummins ............. | 426/2 |
| 4,615,891 A | 10/1986 | Nocek et al. | |
| 5,225,230 A | 7/1993 | Seaman et al. | |
| 5,413,803 A | 5/1995 | Chung | |
| 5,532,008 A | 7/1996 | Sasaoka et al. | |
| 5,720,970 A | 2/1998 | Rode et al. | |
| 5,763,657 A | 6/1998 | Hijiya et al. | |
| 5,824,355 A | 10/1998 | Heitritter et al. | |
| 5,871,773 A | 2/1999 | Rode et al. | |
| 5,885,610 A | 3/1999 | Anderson | |

FOREIGN PATENT DOCUMENTS

| | | |
|---|---|---|
| AU | 66668/74 | 9/1975 |
| AU | 89865/82 B | 5/1983 |
| AU | 13043/83 B | 10/1983 |
| AU | 40736/85 A | 10/1986 |
| AU | 32360/89 B | 7/1989 |
| AU | 73386/91 B | 8/1991 |
| AU | 28883/95 B | 2/1996 |
| AU | 57966/96 B | 11/1996 |

(Continued)

OTHER PUBLICATIONS

Patterson et al., J. Dairy Sci., vol. 71, pp. 3292–3301, 1988.*
Gallligan et al. J. Dairy Sci., vol. 69, pp. 1636–1664, 1986.*
Koenig, et al., Ruminal Escape and Subsequent Absorption of Alimet in the Digestive Tract of Lactating Dairy Cows, Journal of Animal Science, 1996.

(Continued)

*Primary Examiner*—C. Sayala

(57) ABSTRACT

A process for formulating a ruminant food ration in which the methionine needs of the ruminant are determined, a plurality of natural or synthetic feed ingredients and the nutrient composition of each of the ingredients are identified wherein one of the ingredients is 2-hydroxy-4-(methylthio) butanoic acid or a salt, amide or ester thereof, and a ration is formulated from the identified feed ingredients to meet the determined methionine needs of the ruminant which comprises one or more grains, a hydroxy analog of methionine, and optionally a bypass fat wherein (i) the hydroxy analog of methionine is selected from the group consisting of 2-hydroxy-4-(methylthio)butanoic acid and the salts, amides and esters thereof, (ii) the hydroxy analog of methionine is added separately from any bypass fat which is included in the ration, and (iii) the ration is formulated on the basis that at least 20% of the hydroxy analog of methionine is assumed to be available for absorption by the ruminant.

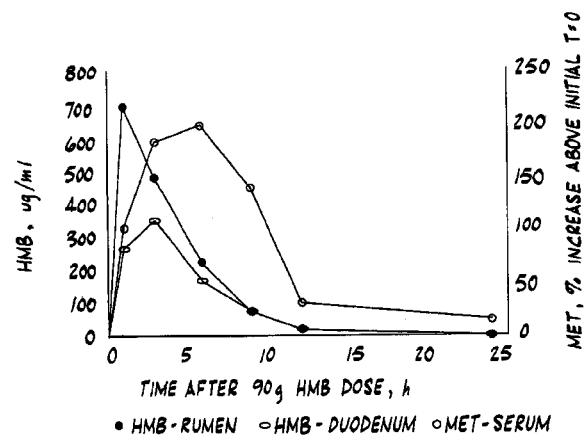

FOREIGN PATENT DOCUMENTS

| AU | 199659741 B2 | 12/1996 |
|---|---|---|
| AU | 11906/97 B2 | 7/1997 |
| AU | 96987/98 B2 | 7/1999 |
| AU | 28130/99 B2 | 11/1999 |
| AU | 199953481 A1 | 4/2000 |
| DE | 1 063 443 | 8/1959 |
| EP | 0 940 088 A2 | 9/1999 |
| WO | 95/12987 A1 | 5/1995 |
| WO | 99/04647 A1 | 2/1999 |
| WO | WO 0028835 | 5/2000 |
| WO | 00/53032 A1 | 9/2000 |
| WO | 02/16671 A1 | 2/2002 |
| WO | 02/30216 A2 | 4/2002 |

OTHER PUBLICATIONS

European Commission Health & Consumer Protection Directorate—General, Report of the Scientific Committe on Animal Nutrition on the Use of a HmBi (Isopropyl Ester of the Hydroxylated Analogue of Methionine, dated Apr. 25, 2003.

Papas, et al., Response of Lambs to Oral or Abomasal Supplementation of Methionine Hydroxy Analog or Methionine, Effects of Methionine Hydroxy–Analog, pp. 653–659, 1974. J. Nutr. vol 104.

Ferguson, The Protection of Dietary Proteins and Amino Acids Against Microbial Fermenation in the Rumen, Pro. 4th Int. Sym. Rumin. Physiol., University of New England, 1975, pp. 448–464.

Wheeler, et al., Effect of Nutrition, Genotype, Lactation and Wool Cover on Response by Grazing Sheep to Methionine Esters and Polymer–encapsulated Methionine, Australian Journal of Agricultural Research, 30: 711–23, 1979.

Physiological & Environmental Limitations to Wool Growth, Proceedings of a National Workshop, Leura, NSW, Australia 1978, pp. 228,229,236.

Stockdale et al., A Review of the Energy and Protein Nutrition of Dairy Cows Through Their Dry Period and its Impact on Early Lactation Performance, Australian Journal of Agricultural Research, vol. 53, 2002, pp. 737–753.

Agric. Vet. Chem. Assoc. Aust. Natn. Conv. Proc., 8th, 1972, pp. 65–79.

Schwab, Rumen–Protected Amino Acids for Dairy Cattle: Progress Towards Determining Lysine and Methionine Requirements, Animal Feed Science Technology 59 (1996) 87–101.

Ayoade, et al., Studies on Methionine Derivatives as Possible Sources of Protected Methionine in Ruminant Rations, Journal of Science Food Agriculture, 1982, 33, 949–956.

Schwab, Methionine Analogs for Dairy Cows: A Subject Revisited, 1998 California Animal Nutrition Conference, Fresno, CA.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 are cancelled.

* * * * *